June 15, 1943.　　　T. B. CHACE　　　2,321,573
WASHING MACHINE
Filed Dec. 23, 1940
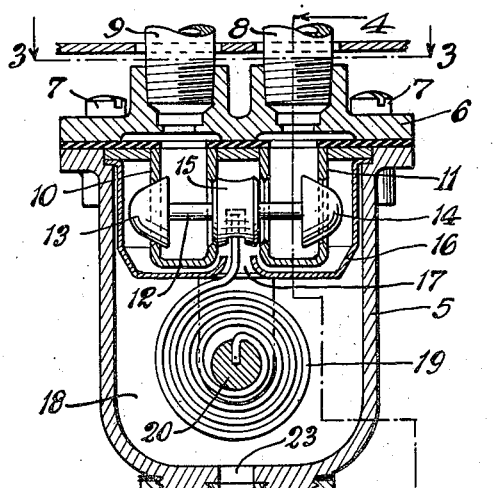
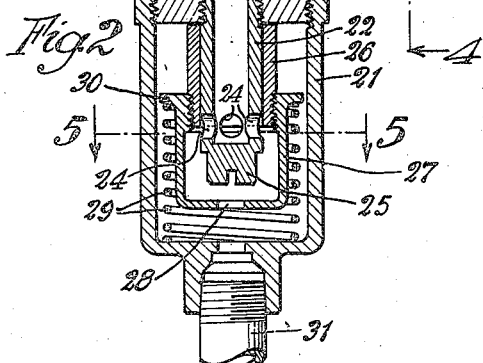
Inventor
Thomas B. Chace
by Parker T Carter
Attorneys.

Patented June 15, 1943

2,321,573

UNITED STATES PATENT OFFICE 2,321,573

WASHING MACHINE

Thomas B. Chace, Winnetka, Ill., assignor to The Dole Valve Company, Chicago, Ill., a corporation of Illinois Application December 23, 1940, Serial No. 371,339

3 Claims. (Cl. 68—207)

This invention relates to washing machines and has for its object to provide a new and improved machine of this description.

The invention has as a further object to provide a washing machine wherein the same amount of water will be admitted to the washing machine at every operation and independent of the pressure of the water.

The invention has further objects which are more particularly pointed out in the accompanying description.

Referring now to the drawing,

Fig. 1 is a side elevation of one form of washing machine embodying the invention;

Fig. 2 is an enlarged sectional view taken on line 2—2 of Fig. 1;

Fig. 3 is a sectional view taken on line 3—3 of Fig. 2;

Fig. 4 is a sectional view taken on line 4—4 of Fig. 3.

Fig. 5 is a sectional view taken on line 5—5 of Fig. 2.

Like numerals refer to like parts throughout the several figures.

In the construction shown there is illustrated a washing machine 1 having a suitable casing 2 with any suitable apparatus 3 for agitating the water and the clothes to be washed. There is a cover 4 through which the clothes are inserted and removed from the machine.

Hot and cold water are mixed together and inserted in the washing machine. Some suitable mixing valve for mixing the hot and cold water is provided. The mixing valve herein shown is provided with a casing 5 having a cover 6 fastened in position by the fastening devices 7. The hot and cold water enter this casing through the inlets 8 and 9, which are connected to suitable sources of hot and cold water. Within the casing is a chamber 10 with which the inlet 9 is connected and a chamber 11 with which the inlet 8 is connected. Each of these chambers has two ports, all of the ports being in alignment, as shown in Fig. 2. These ports are controlled by a suitable valve construction which as herein shown comprises a shaft 12 having valve members 13 and 14 at the ends thereof and an intermediate valve member 15 which is located between the two chambers 10 and 11 and controls the opposed ports in these two chambers, the single valve member controlling both ports.

There is preferably a suitable mixing chamber 16 in the casing 5 which is provided with an outlet 17 through which the mixed hot and cold water passes into the chamber 18 in which is mounted a thermostat 19. This thermostat is illustrated as a coiled bimetal thermostat having one end connected to the member 20. The other end passes through the opening 17 and is connected to the valve device. As herein shown it is loosely connected with the intermediate valve member 15. The thermostat 19 and the valve device regulate the amount of hot and cold water admitted, so as to secure the desired temperature of the water that passes into the washing machine. The thermostat 19 being immersed in the mixed hot and cold water, acts to move the valve members in one direction to decrease the effective area of the hot water ports and increase the effective area of the cold water ports when the temperature rises above a predetermined point, and to move said valve members to decrease the effective area of the cold water ports and increase the effective area of the hot water ports when the temperature of the water falls below a predetermined point.

Some means is provided for automatically delivering the same amount of water to the washing machine in any given interval of time, regardless of variations in pressure of the entering water. As herein shown there is provided such a device attached to the mixing valve. It comprises a casing 21 attached to the casing 5 of the mixing valve. Within this casing is a tube 22 fixed in position and as herein shown it is connected with the casing 5 of the mixing valve. This tube is hollow and is open at the end nearest the mixing valve and is connected with the outlet 23 of the mixing valve. This tube is provided with one or more discharge openings 24 and preferably has a closed end 25. Some means is provided for automatically varying the size of the discharge opening or openings 24 responsive to variations in the pressure of the water. As herein shown this result is secured by providing a tube 26 surrounding the tube 22. The tube 26 is connected with a movable water receptacle 27 which has an outlet 28. A spring 29 engages a fixed part of the casing 21 at one end and the water receptacle 27 at the other end, there being preferably a laterally extending rim 30 on the receptacle 27 engaged by the spring. The casing 21 is provided with a suitable outlet 31 through which the mixed hot and cold water is discharged into the washing machine.

When the water passes from the mixing valve through the tube 22 into the receptacle 27, the pressure of the water acts to move the receptacle 27 and the tube 26 downwardly in opposition to the spring 29 and as the tube 26 moves downwardly, it shuts off more or less of the discharge opening or openings 24, depending upon the amount of pressure. When the pressure decreases, the spring moves the receptacle 27 and the tube 26 upwardly to increase the effective size of the discharge opening or openings 24. The spring is of such strength that the receptacle 27 and tube 26 are automatically moved up and down to control the effective size of the discharge opening or openings 24, so that in any given period of time there will always be discharged the same amount of water therethrough and out the outlet 31 into the washing machine, regardless of the pressure or the variations in pressure of the water entering and passing through the mixing valve.

There is an electromagnetically controlled valve 32 in the connection 33 leading from the mixing valve to the interior of the washing machine for the purpose of opening or closing this connection to admit or shut off water from the washing machine. This valve 32 is controlled by a time switch 34 of any usual construction, preferably located on the washing machine, and which is electrically connected with an electromagnetic device, such as the solenoid 35, the solenoid being connected with the valve so that when it is energized the valve will be opened, and when it is de-energized, the valve will be closed. The time switch is connected to the solenoid 35 and the source of electric supply through the agency of the conductors 36 and 37. The water is withdrawn from the washing machine by means of a pump 38 through a pipe 39 and is discharged through a pipe 40. The pump is actuated by a suitable motor 41. This motor also drives by means of a belt 42, the agitating apparatus 3 in the washing machine.

I claim:

1. A washing machine comprising a casing into which the material to be washed is placed, a mixing valve for mixing hot and cold water to be inserted in said casing, and an automatic flow control device connected with the mixing valve, the flow control device and the mixing valve forming a unitary construction for delivering equal amounts of water to the casing in equal intervals of time.

2. A washing machine comprising a casing into which the material to be washed is placed, a mixing device for mixing water of different temperatures and at different pressures, means connected with the outlet of the mixing device for delivering the mixed water to said washing machine casing in equal amounts in equal intervals of time, regardless of the variation in pressure of said water, and automatic means for shutting off the flow of water to the washing machine casing when a predetermined amount of water has entered said casing.

3. A washing machine comprising a casing into which the material to be washed is placed, a valve casing associated with said washing machine casing, having two inlets, one for hot water and the other for cold water, a thermostatically controlled mixing device in said valve casing for mixing the hot and cold water, means comprising a pressure controlled valve device for delivering equal amounts of mixed water to the washing machine casing in equal intervals of time, regardless of the variations in pressure of the water in the valve casing, said means and said valve forming a unitary device, a valve for controlling the passage of the water into said washing machine casing, and means for automatically controlling said valve so as to automatically shut off the flow of water into the washing machine casing after a predetermined amount of water has been delivered to the washing machine casing.

THOMAS B. CHACE.